US008195395B2

(12) United States Patent
Teng et al.

(10) Patent No.: US 8,195,395 B2
(45) Date of Patent: Jun. 5, 2012

(54) SYSTEM FOR MONITORING, DETERMINING, AND REPORTING DIRECTIONAL SPECTRA OF OCEAN SURFACE WAVES IN NEAR REAL-TIME FROM A MOORED BUOY

(75) Inventors: Chung-Chu Teng, Slidell, LA (US); Rodney Riley, Long Beach, MS (US); Richard Bouchard, Gulfport, MS (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 373 days.

(21) Appl. No.: 12/554,910

(22) Filed: Sep. 6, 2009

(65) Prior Publication Data

US 2011/0060525 A1    Mar. 10, 2011

(51) Int. Cl.
*G01V 3/00*    (2006.01)
*G01V 7/00*    (2006.01)

(52) U.S. Cl. .................. 702/2; 702/45; 702/50; 702/76; 702/77; 702/141; 702/150; 702/151; 702/179; 702/188; 702/191

(58) Field of Classification Search ................ 702/2, 45, 702/50, 76, 77, 141, 150, 151, 179, 188, 702/191; 324/76.19, 76.21; 73/170
See application file for complete search history.

(56) References Cited

U.S. PATENT DOCUMENTS

| | | | |
|---|---|---|---|
| 3,301,047 A | | 1/1967 | Von Wald, Jr. |
| 4,515,013 A | * | 5/1985 | Hue ........................... 73/170.01 |
| 4,986,121 A | | 1/1991 | Luscombe |
| 5,960,373 A | * | 9/1999 | Fukuda et al. .................. 702/76 |
| 6,847,326 B2 | | 1/2005 | Harigae |
| 6,965,320 B1 | * | 11/2005 | Casey et al. .............. 340/870.07 |

FOREIGN PATENT DOCUMENTS

| | | |
|---|---|---|
| JP | 60149911 | 8/1985 |
| JP | 2005083998 | 3/2005 |

OTHER PUBLICATIONS

Teng et al., Determination of Pitch and Roll Angles from Data Buoys, 2004, IEEE, vol. 3, pp. 1348-1355.*

(Continued)

*Primary Examiner* — Michael Nghiem
*Assistant Examiner* — Yaritza H Perez Bermudez
(74) *Attorney, Agent, or Firm* — Robert Platt Bell

(57) ABSTRACT

A moored buoy floating at the ocean surface and anchored to the seafloor precisely measures acceleration, pitch, roll, and Earth's magnetic flux field of the buoy over a limited sampling period. The system includes: 1) A buoy, 2) A mooring system, 3) An electronic data logger controlling communications between the system and the on-board remote telecommunications system, 4) an embedded computer for data input/output, temporary or permanent data storage, and algorithms to convert the measured time series data into surface ocean wave spectra and quality assurance statistics and encode the results for transfer to the data logger, 5) Sensors include one or three acceleration sensors, three orthogonal angular rate sensors, and three orthogonal magnetometers to measure the Earth's magnetic flux field, 6) A telecommunications system that links the buoy data logger and a shoreside processing system, and 7) A shoreside processing system that decodes the transmitted data, performs, quality control, and computes derived wave parameters.

18 Claims, 2 Drawing Sheets

OTHER PUBLICATIONS

Wellicome et al., The Design, Construction and Calibration of a Wave Buoy for Ship Model Tests in Open Water, Oct. 1999, University of Southampton, Ship Science Report No. 112, pp. 1-19.*

LeBlanc, L. R. ; Middleton, F. H., "Pitch-Roll Buoy Wave Directional Spectra Analysis", Nov. 1982, Rhode Island Univ Kingston.

L.C. Bender et al., "Wave Heights from a 3M Discus Buoy during Hurricane Katrina", Proceedings of the MTS/IEEE Oceans 2008 Conference, Quebec City, Canada, Sep. 15-18, 2008.

Steele, K.E. Earle, "Directional ocean wave spectra using buoy azimuth, pitch, and roll derived from magnetic field components" IEEE Jrnl of Oceanic Eng. Oct. 1991.

D.S. Vlachos, "The use of vertical and horizontal accelerations of a floating buoy for the determination of directional wave spectra in coastal zones" Mar. 2008.

Huang, MD, "Time domain simulation of data buoy motion," Proc Natl. Sci. Counc. ROC(A), vol. 22, No. 6, pp. 820-830, 1998.

Wellicome, J.F., Temarel, P., Molland, A.F., Cic, J. And Taunton, D.J. (1999) The design, construction and calibration of a wave buoy for ship model tests in open water.

F. P. Brissette, Estimation of Wave Directional Spectra from Pitch-Roll Buoy Data, Journal of Waterway, Port, Coastal and Ocean Eng., vol. 120, No. 1, Jan./Feb. 1994, pp. 93-115.

Tannuri Eduardo A, Estimating directional wave spectrum based on stationary ship motion measurements, Applied ocean research, 2003, vol. 25, No. 5, pp. 243-261.

* cited by examiner

SYSTEM FOR MONITORING, DETERMINING, AND REPORTING DIRECTIONAL SPECTRA OF OCEAN SURFACE WAVES IN NEAR REAL-TIME FROM A MOORED BUOY

STATEMENT OF GOVERNMENT INTEREST

The research that led to the development of the present invention was sponsored by the National Oceanic and Atmospheric Administration's (NOAA's) National Data Buoy Center. NOAA is a part of the U.S. Department of Commerce, a component of the U.S. Federal government. The United States Government has certain rights in the present invention.

FIELD OF THE INVENTION

The present invention relates to wave measurement using moored buoys. In particular, the present invention is directed toward the National Data Buoy Center's (NDBC) directional wave measurement system, which uses a system of sensors, processors, algorithms, and communications on a moored buoy to measure the components of a directional wave spectrum and transmit the spectrum to a shoreside processing center for analysis and dissemination.

BACKGROUND OF THE INVENTION

Off-Shore buoys are used for a number of purposes: for navigation, communication, and also to measure weather and wave conditions. The National Oceanic Atmospheric Administration (NOAA) through the National Data Buoy Center, maintains a number of offshore buoys to measure water temperature and wave height, among other parameters. This data may then be transmitted to shore and processed and presented as part of weather forecasts, either on the NOAA website, or through NOAA weather radio, for use by Mariners and others, in predicting weather and wave conditions.

The U.S. National Data Buoy Center (NDBC) of the National Weather Service (NWS), a part of the U.S. National Oceanic and Atmospheric Administration (NOAA), operates a large number of buoys in areas of interest to the United States. Each hour (in a few cases every 30 minutes) meteorological, oceanographic, and wave data are acquired, transmitted to shore via satellite telecommunications, and distributed to users following real-time, automated data quality control. NDBC made its first non-directional wave measurements from buoys in 1973 and its first directional wave measurements in 1975. The program has expanded so that now all NDBC buoys make wave measurements and most make directional wave measurements.

While many existing weather data buoys adequately measure wave height, oftentimes other wave data, such as direction, may be useful in marine weather forecasts and for other uses. For example if wave direction is opposite tidal direction, oftentimes conditions can exist near shore where wave heights may increase. In addition, wave direction may differ from wind direction, and thus a report of wind direction may not always be indicative of wave direction. When plotting a course, a mariner may wish to avoid certain wave orientations (e.g., broaching waves) and thus wave direction data may be useful to mariners. Scientists and others may find wave direction data useful in studying shore erosion and other environmental impacts of waves. Furthermore, other wave data, such as wave slope and the like may be useful to oceanographers and engineers, as well as mariners. The term wave spectra is used in the art to describe the distribution of wave parameters as a function of frequency (Hertz (Hz)).

Various idealized spectra are used in oceanography and ocean engineering. Perhaps the simplest is that proposed by Pierson and Moskowitz (1964). They assumed that if the wind blew steadily for a long time over a large area, the waves would come into equilibrium with the wind. This is the concept of a fully developed sea. Here, a long time is roughly ten-thousand wave periods, and a "large area" is roughly five-thousand wave-lengths on a side. Hasselmann et al., (1973), after analyzing data collected during the Joint North Sea Wave Observation Project JONSWAP, found that the wave spectrum is never fully developed. It continues to develop through non-linear, wave-wave interactions even for very long times and distances. The JONSWAP spectrum is similar to the Pierson-Moskowitz spectrum except that waves continues to grow with distance (or time), and the peak in the spectrum is more pronounced. The latter turns out to be particularly important because it leads to enhanced non-linear interactions and a spectrum that changes in time according to the theory of Hasselmann (1966).

A number of buoys are known in the art which measure wave height and other data using accelerometers or other instruments. Hue, U.S. Pat. No. 4,515,013, issued May 7, 1985, and incorporated herein by reference, discloses a buoy with accelerometers and magnetometers, for measuring the vertical acceleration, but fails to teach or suggest an algorithm for determining wave direction or wave slope from wave spectra. Luscombe, U.S. Pat. No. 4,986,121, issued Jan. 21, 1991, and incorporated herein by reference, discloses an apparatus for measuring the vertical movement of a floating platform. This reference appears to be along the lines of Hue above, in that it only measures vertical motion. Such devices are useful in determining wave heights but do not appear to detect wave direction or other spectral data.

Harigae, U.S. Pat. No. 6,847,326, issued Jan. 25, 2005, and incorporated herein by reference, discloses a floating device for measuring wave height and tidal current direction and speed using GPS technology. This apparently free-floating buoy uses GPS data to determine tidal current direction and speed. The reference does not appear to teach measuring wave direction, slope, or other spectra. Von Wald, Jr., U.S. Pat. No. 3,310,047, issued Jan. 31, 1967, and incorporated herein by reference, discloses a wave gauge array for obtaining ocean wave spectra. This device appears to only measure wave height.

Mayberry, Published Japanese Patent Application 6014991 published Aug. 7, 1985, and incorporated herein by reference, discloses an apparatus for detecting of wave motion azimuth. From the translated Abstract, it does not appear that this reference measures more than wave height. Yamaguchi, Published Japanese Patent Application 2005083998, published Mar. 31, 2005, and incorporated herein by reference, discloses a GPS Ocean Wave Measuring Device. This device appears to measure only the period of the wave.

A number of non-patent literature documents disclose wave-measuring buoys. Pitch-Roll Buoy Wave Directional Spectra Analysis, Accession Number: ADP000383, by LeBlanc, L. R.; Middleton, F. H. (November 1982, Rhode Island University, Kingston) discloses a single small buoy, either free-floating or tethered to an anchor, designed not to follow the slope of the water surface, but instead to pitch and roll according to the orbital particle-velocity gradient. The dynamics of this buoy system are such that the data obtained on heave, pitch, roll, and compass bearing can be transformed into complete directional wave spectra. The buoy used to produce these data was an Endeco Model 956 Wave-Track buoy and the experiment was conducted as part of ARSLOE (Atlantic Remote Sensing Land-Ocean Experiment, fall 1980).

While Middleton's technique may provide directional wave spectra, his system does not account for acceleration data noise created when a buoy pitches and rolls. Thus, it remains a requirement in the art to provide a technique for generating a complete wave data spectra while compensating for accelerometer data noise induced by pitch and roll in a buoy, in a manner that is compact and easy to implement in a cost-effective manner.

SUMMARY OF THE INVENTION

The present invention comprises a portable moored system for the real-time measurement of the ocean surface directional wave spectrum. Measurement and reporting of the surface ocean wave spectra with the present invention provides data from the ocean that is essential for marine weather analysis, forecasts, and warnings. Additional applications of the present invention include maritime operations and safety (e.g., marine transportation, offshore operations, etc.), planning and design of coastal structures and processes, information for ocean and coastal zone activities (e.g., boating, fishing, surfing, etc.), validation of remotely sensed surface ocean wave systems and method and numerical ocean wave models, and the use for forensic purpose for at-sea mishaps.

The invention can be used by research organizations (government—Federal, State, etc.), commercial entities, such as Harbor Pilot's Associations, Oil and Gas Exploration Companies, Ship Routing Services or Weather Forecast Services, or the general public to obtain detailed sea state information for safe and efficient maritime operations.

The invention uses a moored buoy floating at the ocean surface and anchored to the seafloor that precisely measures the acceleration, pitch, roll, and Earth's magnetic flux field of the buoy over a limited sampling period. A moored buoy system is essential to the progress of maritime weather forecast and safety by providing a more accurate and precise determination of the surface ocean wave spectra than can be determined from traditional observations from ships or from remote sensing applications. The moored buoy system maintains its position in the face of hazardous maritime conditions that ships would normally avoid and thus can make measurements without hazarding vessels or life. NDBC has developed reliable, cost-effective surface ocean wave spectra measurements that can be integrated into a moored system. An operational network of instrumented, moored buoys making real-time ocean surface spectra measurements has been established off-shore of the United States and on the Great Lakes. In real-time the surface buoy communicates with shoreside processing facility to decode, analyze, and re-distribute the ocean wave spectral data and its derived parameters to national and international maritime weather, safety, and operations.

Until the development of the present invention, at sea ocean wave spectra measurements were limited to a few costly, bulky, expensive, and specialized observing systems. The use of a moored buoy system together with a compact wave measurement system allows the expansion of a network of surface ocean wave spectral measurements co-located with other important maritime environmental observations, such as wind speed and direction, air temperature, and atmospheric pressure.

The Digital Directional Wave Module (DDWM) was developed in support of the National Weather Service and maritime operations interest (e.g., commercial shipping, Coast Guard Search and Rescue, Oil and Gas drilling platforms). The primary goal of the system was to provide accurate, precise, timely, and low-cost surface ocean wave spectra measurements. Additional goals included compatibility with existing NDBC systems and reduced life-cycle costs.

The DDWM was developed and tested as a prototype by NDBC in 2007. Currently the DDWM is operational on more than 18 moored buoys of the NDBC network of 105. NDBC is responsible for all aspects of system maintenance, operation, deployment recovery, documentation, and life-cycle management.

The components of the surface ocean wave spectra measurement system include: 1) A buoy, 2) A mooring system consisting of an anchor on the seafloor, mooring line connecting the anchor and the buoy, 3) An electronic datalogger that controls the communications between the wave measuring system and the on-board remote telecommunications system, 4) an embedded computer including printed circuit board for data input/output, temporary or permanent data storage, and algorithms to convert the measured time series data into surface ocean wave spectra and quality assurance statistics and encode the results for transfer to the datalogger, 5) Sensors include one or three acceleration sensors, three orthogonal angular rate sensors, and three orthogonal magnetometers to measure the Earth's magnetic flux field, 6) A telecommunications system that links the buoy datalogger and a shoreside processing system, and 7) A shoreside processing system that decodes the transmitted data, performs, quality control, and computes derived wave parameters.

The buoy measures vertical acceleration (the up and down) and the tilt of the buoy to get the slope. It takes a combination of accelerometers, magnetometers, and angular rate sensors to determine wave direction with respect to True North. The wave directions are first calculated using accelerometers and angular rate sensors in the buoy frame of reference (fore and aft, starboard and port). The magnetometers are used to tell how the buoy is oriented with respect to the magnetic direction, and the wave direction is rotated, determined in the buoy frame of reference into the magnetic direction. Lastly the directions are rotated using the magnetic declination or variation to get the wave directions with respect to earth True North directions.

The algorithm, which is actually a collection of algorithms, is unique. The noise correction does not use the tilt data. The tilt data causes noise in the acceleration data, but the algorithm of the present invention uses the presence of signals in the very lowest frequencies, which do not contain relevant wave information, to estimate what that noise is.

The algorithm is used shoreside and on the buoy. Shoreside it is used to remove the noise from the vertical acceleration spectrum. On the buoy it used to determine the lowest frequency at which to start the integration of the angular rate measurements to get pitch and roll.

BRIEF DESCRIPTION OF THE DRAWINGS

The embodiments, features and advantages of the invention described herein will occur to those skilled in the art from the following description of a preferred embodiment and the accompanying drawings, in which.

DETAILED DESCRIPTION OF THE INVENTION

Figure 1:
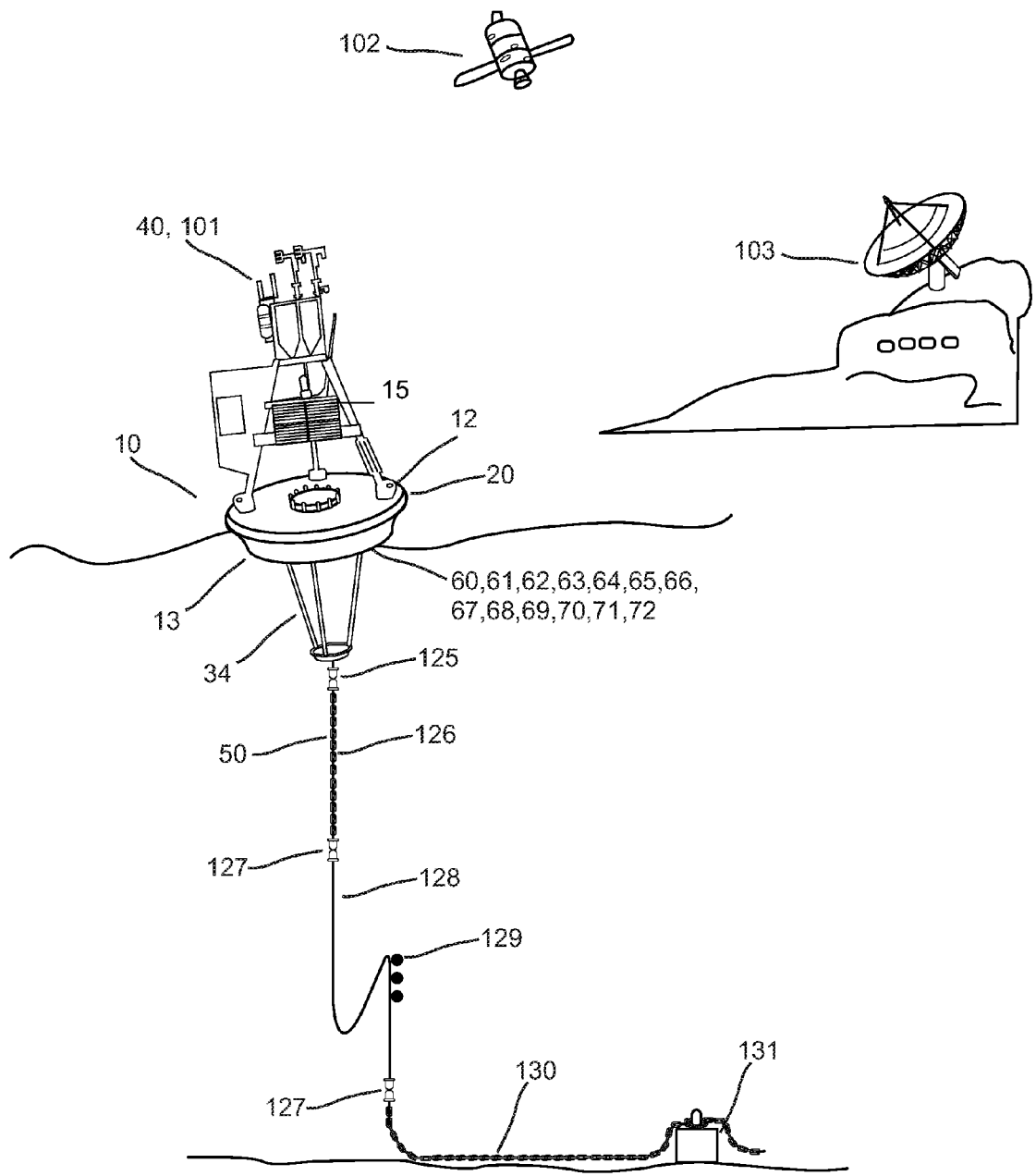
FIG. 1 shows a typical mooring system used in accordance with the present invention.

Referring to FIG. 1, each surface ocean wave spectra measurement system uses a discus-shaped surface buoy 10 to measure heave, pitch, and roll of the buoy's hull 13, as the waves pass beneath. Within discus-shaped surface buoy 10 is a Digital Directional Wave Module (DDWM) 12, a datalogger 20, a power system 15, and a communications system 40. Surface buoy 10 follows wave motions (both water surface elevation and wave slopes) as closely as possible so ocean wave information can be determined from the buoy motion (buoy's heave and tilt motion). Thus, a discus-shaped surface buoy 10, which can follow wave height and slopes better than other shapes, is usually used for directional wave measurement. Buoy tilt data may be used to determine wave slope, an important component of the overall wave spectra.

A mooring system 50 keeps discus-shaped surface buoy 10 within a general vicinity but sufficient slack or scope is provided to allow discus-shaped surface buoy 10 to respond to the waves for better directional wave measurement. A typical mooring system, from the ocean bottom to the surface, may comprise an anchor 131, a length of chain 130, shackles 127, nylon rope 128 and syntactic floats 129, shackles, another section of chain 126, swivel and shackles 125 that connect to the buoy bridle 34. Size and length of the components vary depending on the ocean depth and bottom surface characteristics.

The DDWM consists of sensors 60, an embedded computer 70, connections to the sensors 71, and a serial communication link 72 to the datalogger 20. Sensors 60 comprise at least one and up to three orthogonal acceleration sensors (61,62,63), three orthogonal magnetometers (64,65,66), and three angular rate sensors (67,68,69).

All sensors 60 are sampled at the same rate to make a cotemporaneous times series of the measurements. Sampling is controlled by the embedded computer 70 of the wave processing system and its associated processing algorithm. DDWM 12 controls and regulates the power to the sensors used to measure buoy hull motion and the earth's magnetic field.

Sensors 60 on discus-shaped surface buoy 10 measure vertical acceleration (the up and down) and the tilt of discus-shaped surface buoy 10 to get the slope. It takes a combination of accelerometers (61,62,63), magnetometers (64,65,66), and angular rate sensors (67,68,69) to determine wave direction with respect to True North. The wave directions are first calculated in computer 70 using accelerometers (61,62,63) and angular rate sensors (67,68,69) in the buoy frame of reference (fore and aft, starboard and port). Magnetometers (64,65,66) are used to tell how the buoy is oriented with respect to the magnetic direction, and the wave direction is rotated, determined in the buoy frame of reference into the magnetic direction. Lastly the directions are rotated using the magnetic declination or variation to get the wave directions with respect to earth True North directions.

The algorithm, which is actually a collection of algorithms shown in the attached appendices, is unique. The noise correction does not use the tilt data. The tilt data causes noise in the acceleration data, but the algorithm of the present invention uses the presence of signals in the very lowest frequencies, which do not contain relevant wave information, to estimate what that noise is.

The algorithm is used shoreside and on discus-shaped surface buoy 10. Shoreside it is used to remove the noise from the vertical acceleration spectrum. On discus-shaped surface buoy 10 it used to determine the lowest frequency at which to start the integration of the angular rate measurements to get pitch and roll.

The buoy electronics use a +12V (nominal), solar recharged battery system. Primary batteries (non-rechargeable) are switched on by a power system controller if the secondary (re-chargeable) system fails. Datalogger 20 controls operation of the wave system by applying the battery power to the DDWM 12 and may send control parameters via a serial communications link. Once the DDWM 12 has acquired the raw sensor data and the wave processing algorithm has completed, the data are sent to the datalogger 20 via a serial communications link 72. The datalogger 20 then includes this data in its environmental data telemetry to shoreside processing system 103 in near real-time via the communication system 40.

The embedded computer 70 contains the processing code to use Fast Fourier Transforms (FFTs) to transform the data from the time domain into the frequency domain (that is, spectrum) that provides Fourier coefficients at discrete frequencies. The Fourier coefficients of adjacent discrete frequencies are averaged (known as band-averaging) to smooth the spectrum and reduce the amount of data that needs to be transmitted to the shoreside processing system 103. The embedded computer 70 then transforms the band-averaged Fourier coefficients into a set of directional wave parameters in terms of spectral density, directions, and spreading functions of the waves via a unique NDBC-developed algorithm. The embedded computer 70 also computes statistics (mean, maximum, minimum, and standard deviation) of the time series measurements and other quality control parameters, which are very useful for monitoring wave data quality and for assisting in troubleshooting system malfunctions.

The embedded computer 70 finally encodes the directional wave spectral data and the statistics into an efficient format for relay to the datalogger 20 when the datalogger 20 requests the message from the wave processing system at scheduled times.

The primary measurement is the heave or the acceleration of the buoy perpendicular to the normal surface of the ocean. The accelerometer is fixed to be aligned perpendicular to the buoy's horizontal deck. The intent is to measure the accelerations with respect to perpendicular of the undisturbed steady state sea surface, but in reality the pitch and roll of the buoy cause the accelerometer to tilt from the true vertical. Several previous studies conducted by NDBC show some level of low-frequency noise could be present due to the tilt effect on fixed accelerometers. In addition, other noise (e.g., electronic noise) could also exist, especially at low frequencies. Accelerations or acceleration spectra measured by an accelerometer need to be converted into displacements (or displacement spectra) via an integration algorithm. To remove noise that can be amplified by the integrations, NDBC developed a unique algorithm to determine a cut-off frequency and to remove/correct low-frequency noise.

The angular rate sensors measure the buoys rotation about three orthogonal axes and can be integrated using Fast Fourier Transforms (FFT) and inverse FFT (IFFT) to compute the time-dependent portion, time-series of pitch and roll following the method of Steele et al., 1998. The forward and inverse FFTs are performed until the algorithm converges on a solution. Another algorithm was developed and is used to determine the mean pitch and roll to be added to the time-dependent pitch and roll calculations.

Once pitch and roll time series are determined, in conjunction with the acceleration time series the co-spectra and quadrature spectra are computed from FFTs and directional wave spectra with respect to the buoy's coordinates system are determined following the method of Longuet-Higgins et al., 1963.

The orientation of the buoy with respect to True North is determined from the measurements of the horizontal and vertical Earth's flux made by the three orthogonal magnetometers (64,65,66), the buoy's pitch and roll, the expected Earth's magnetic flux at the buoy location, and correcting factors for the electro-magnetic effects of the hull and on-board electronics. The expected Earth's magnetic flux may be determined from the mean flux measurements or from a magnetic flux model. If used, the model information is entered into the DDWM before deployment.

The determined orientation of the buoy is applied to the directional components in the buoy hull coordinate system to produce directional data with respect to Magnetic North. Finally the directional data are transformed to True North by applying the known magnetic declination at the buoy location to the magnetic results. The magnetic declination is entered into the DDWM before deployment.

The datalogger 20 adds the wave spectral data message to the environmental data message of the other on-board measuring systems (for example, anemometers and barometers) and transmits the message to the shoreside processing system 103 from an on-board transmitter 101 via satellite 102. The shoreside system 103 generally receives the wave data within 30 minutes of the conclusion of the wave sampling period.

The shoreside processing system 103 decodes the messages, processes the wave data, computes derived wave parameters, performs automated quality control, and then encodes the wave data for further dissemination. The shoreside processing applies algorithms to the acceleration spectra to remove noise caused by the tilting of the buoy and adjusts the acceleration spectra by applying transfer functions for the hull-mooring response and the sensor responses. After the acceleration spectra are corrected and adjusted, the acceleration spectra are transformed into displacement spectra by double integration. Double integration is accomplished in the frequency domain by dividing the spectra by the radian frequency to the fourth power. Corrections or adjustments may or may not be made to the directional spectra. From the displacement spectra various wave parameters may be derived, such as Significant Wave Height, Dominant or Peak Period (the inverse of the frequency that has the maximum spectral density within the spectrum), Average Period, and Mean Wave Direction at the Dominant Period. The shoreside processing facility also has the capability to reprocess the received spectral data using different response functions.

Figure 2:
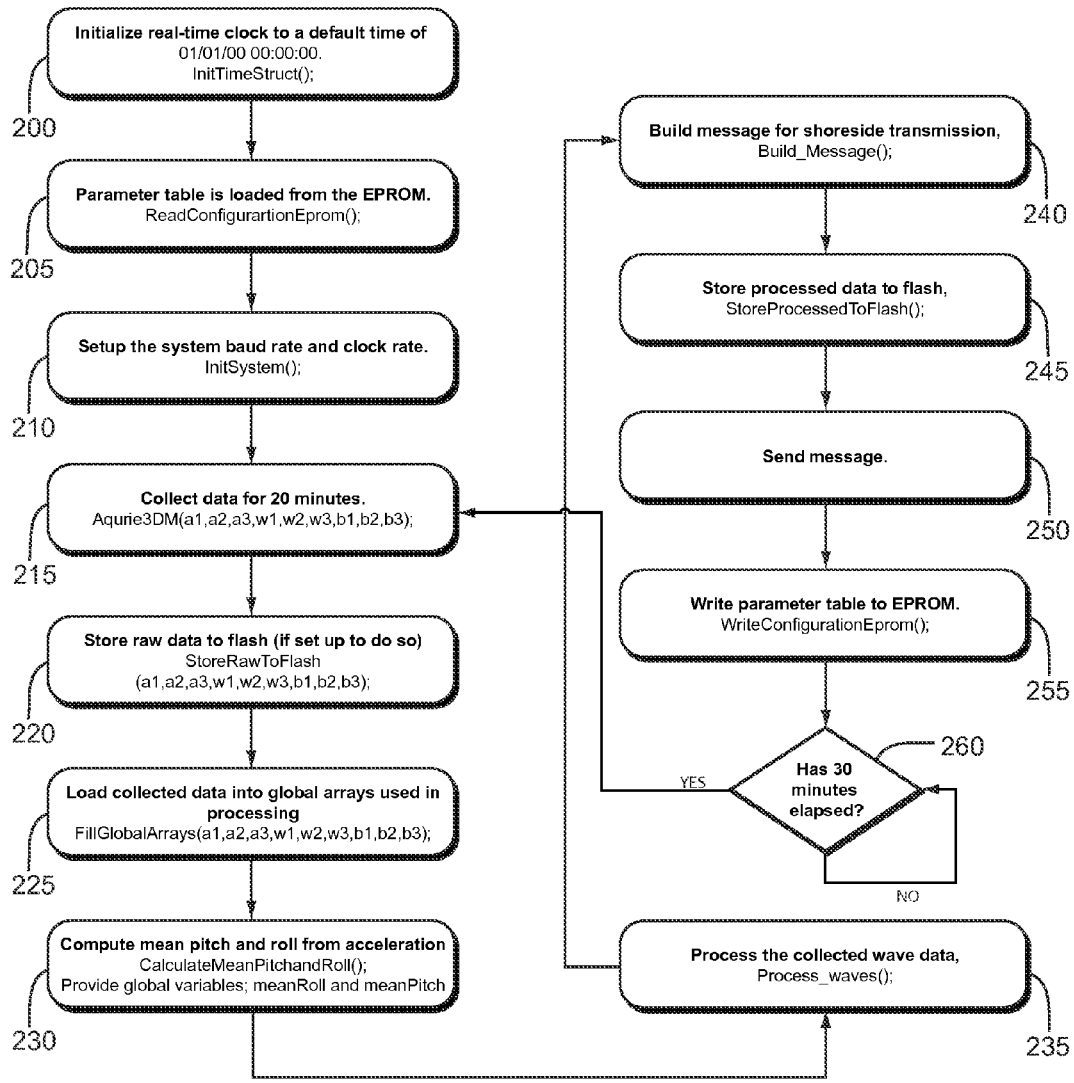
FIG. 2 is a flow chart illustrating the steps in the operation of the algorithm portion of the present invention.

FIG. 2 is a block diagram illustrating the process of the present invention. Source code for these algorithm portions is shown in Appendices A and B attached herewith. Referring to FIG. 2, in step 200, the real-time clock is initialized to a default time of 01/01/00 00:00:00. In step 205, the parameter table is loaded from the EPROM. In step 210, the system baud rate is setup up, along with the clock rate. In step 215, data is then collected for 20 minutes.

In step 220, the raw data is stored to flash memory (if setup to do so) and in step 225, collected data is loaded into global arrays used in processing. In step 230, a mean pitch and roll of the buoy is calculated from acceleration data from accelerometers and rate sensors in the buoy. In step 235, collected wave data based on mean pitch and roll is then processed. In step 240, a message is built up for shoreside transmission. In step 245, the processed data is then stored to flash memory, and in step 250 the message is sent to shore. In step 255, the parameter table is then written to EPROM and in step 260 it is determined whether 30 minutes has elapsed. If so, processing returns to step 215 to repeat the process and collect another 20 minutes of data.

The Wave Processing Algorithms for the Digital Directional Wave Module (DDWM) for computing mean pitch and roll in step 230 and processing collected wave data in step 235 are described as follows. The on-board processing of the Digital Directional Wave Module (DDWM) consists of several modules from the main program illustrated in FIG. 2. The wave processing is performed with the Process_Waves (Table 1) module within the process.c Program (Appendix A is the Source Code Listing). Process_Directional (Table 2) performs the remainder of the wave processing before results are saved for encoding.

Other routines are used to Save intermediate and final results, perform both the forward and backward FFT depending on the calling argument (R1fft), and Compute mean pitch and roll from the ratio of the horizontal components of acceleration to the vertical component (meanPitchRoll.c, Appendix B for source code) as set forth in step 230 of FIG. 2.

Once the data are transmitted to the shoreside processing facility, NDBC removes noise that appears in the low-frequencies for fixed or strapped down accelerometers by applying empirically derived algorithms to the measured acceleration spectral densities. The algorithm assumes that the energy in the lowest frequency band (f(n=0)) of the DDWM represents noise from the tilt of the accelerometer. This unwanted noise is amplified when the double integration takes place to compute displacement spectral densities from the acceleration spectral densities.

TABLE 1

| Process_Waves Flow | |
| --- | --- |
| Load_Arrays | Loads test data from a user specified file and loads it into the data arrays. |
| ↓ | |
| Process_Waves | Handles flow control for wave data processing. |
| ↓ | |
| Calc_Magnetic_Fields | Calculate the magnetic fields B and Bd. |
| ↓ | |
| GetBey | Gets the Earth's magnetic field from buoy measurements. |
| ↓ | |
| Run_Input_Stats | Calculates and displays the mean, minimum, maximum, and standard deviation of the input arrays. |
| ↓ | |
| Stat | Calculates and displays the mean, minimum, maximum, and standard deviation of the specified array. |
| ↓ | |
| Process_Directional | Handles all the processing necessary for a directional wave. |

TABLE 2

| Processs_Directional Flow | |
| --- | --- |
| Setup_Nfreq | Sets up the nfreq data array to be used for spectral analysis. |
| ↓ | |
| NonDirectional_Spectra | Performs non-directional spectral analysis on wave data. |
| ↓ | |
| Noise_Correction | Finds the low frequency cutoff for the integration of the angular rate. |
| ↓ | |
| ARS_pitch and roll | This routine calculates Pitch and Roll from angular rate sensors. |
| ↓ | |
| ARS_XYslope_Azimuth | Calculate azimuth using angular rate pitch and roll. |
| ↓ | |
| Run_Stats_II | Calculates and outputs statistical data on processed data. |
| ↓ | |
| Cross_Spectra | Performs cross spectral analysis on wave data. |
| ↓ | |

TABLE 2-continued

| Processs_Directional Flow | |
|---|---|
| Calc_Equations | Calculates values needed for further processing of wave data. |
| ↓ | |
| Save_Results | |

The algorithm is used shoreside and within the on-board processing (see Routine name Noise Correction). In the on-board processing, it is used to determine the lowest frequency at which to start the integration of the angular rate measurements to determine pitch and roll.

C11M(f(n)): Acceleration spectral density for a frequency, f(n), where n presents the index of the frequency band. For the DDWM, n={0:46}.

The Noise Correction for each frequency band (NC(f(n))) is computed as follows:

$$NC(f(n))=20*C11M(f(n=0))*(0.18-f(n)), \text{ for } NC(f(n))>=0;$$

$$NC(f(n))=0, \text{ for } NC(f(n))<0;$$

NC(f(n)) is then subtracted from each C11M(f(n)). If the result of the subtraction is less than zero, then the result is set to zero.

The advantages of the invention over other wave measuring systems are the adjustments and corrections of the spectra. In many cases, these adjustments and corrections complicate the processing and are not considered cost-effective measures. These adjustments and corrections elevate the invention's measurements to more exacting precision and accuracy than if they were ignored.

As noted in the Background of the Invention, the Prior Art of Middleton, while providing directional wave spectra, does not provide a means for filtering out acceleration data noise. The present invention provides an algorithm that uses the VLF signals to estimate acceleration data noise and to automatically identify the cut-off frequency for starting integration of angular rate measurements. Thus, the present invention, provides a number of improvements over the apparatus and methods of the Prior Art, including more accurate & less noisy measurements due to the unique algorithms disclosed herein, and the entire system which, together, provide a more affordable and deployable capability than others have achieved in terms of less costly/bulky/compact.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A system for measuring spectra of surface ocean waves in near real-time comprising:
   a discus-shaped buoy floating at the ocean surface and moored to the seafloor, the discus-shaped buoy moving in response to wave action;
   buoy motion sensors, mounted to the buoy, for measuring vertical acceleration and angular rate of the buoy;
   a wave processing system, coupled to the buoy motion sensors, for converting vertical acceleration and angular rate into pitch and roll measurements of the buoy and generating wave spectral data from the pitch and roll measurements of the buoy, the wave processing system correcting vertical acceleration measurements to compensate for angular rate of the buoy; and
   a telecommunications relay system, coupled to the wave processing system, for transmitting wave spectral data to a shoreside processing system, the shoreside processing system processing the wave spectral data to remove noise from the wave spectral data and disseminating processed wave spectral data to users,
   wherein the shoreside processing system corrects noise for at least one frequency band, where:
   C11M(f(n)) is the acceleration spectral density for a frequency, f(n), where n presents the index of the frequency band; and
   The Noise Correction for each frequency band (NC(f(n))) is computed as follows:

$$NC(f(n))=20*C11M(f(n=0))*(f(n)-0.18), \text{ for } NC(f(n))>=0;$$

$NC(f(n))=0$, for $NC(f(n))<0$; and
   NC(f(n)) is then subtracted from each C11M(f(n)) and if a result of the subtraction is less than zero, then the result of the subtraction is set to zero.

2. A system for measuring spectra of surface ocean waves in near real-time comprising:
   a discus-shaped buoy floating at the ocean surface and moored to the seafloor, the discus-shaped buoy moving in response to wave action;
   buoy motion sensors, mounted to the buoy, for measuring vertical acceleration and angular rate of the buoy;
   a wave processing system, coupled to the buoy motion sensors, for converting vertical acceleration and angular rate into pitch and roll measurements of the buoy and generating wave spectral data from the pitch and roll measurements of the buoy, the wave processing system correcting vertical acceleration measurements to compensate for angular rate of the buoy; and
   a telecommunications relay system, coupled to the wave processing system, for transmitting wave spectral data to a shoreside processing system, the shoreside system processing the wave spectral data to remove noise from the wave spectral data and disseminating processed wave spectral data to users,
   wherein said buoy motion sensors comprise at least one accelerometer aligned with the buoy's vertical axis, three orthogonal angular rate sensors, and three orthogonal magnetometers and,
   wherein the wave processing system determines buoy orientation with respect to True North from measurements of Earth's Magnetic flux by the three orthogonal magnetometers, pitch and roll information from the angular rate sensors, corrections for the buoy's hull and electronic effects, and the magnetic declination at the buoy's location and wherein the wave processing system determines wave direction from pitch and roll data relative to buoy orientation with respect to True North.

3. The system of claim 2, wherein the wave processing system uses Fast Fourier Transforms (FFTs) to transform the acceleration and angular rate data time domain into the frequency domain providing Fourier coefficients at discrete frequencies.

4. The system of claim 3, wherein the wave processing system band averages the Fourier coefficients of adjacent discrete frequencies of the wave spectrum to reduce data volume transmitted to the shoreside processing system.

5. The system of claim 4, wherein the wave processing system transforms band-averaged Fourier coefficients into a set of directional wave parameters in terms of spectral density, directions, and spreading functions of the waves using a predetermined algorithm.

6. The system of claim 5, wherein the wave processing system computes statistics including one or more of mean, maximum, minimum, and standard deviation of time series measurements.

7. The system of claim 2, wherein the at least one accelerometer comprises one accelerometer aligned with the buoy's vertical axis.

8. The system of claim 2, wherein the telecommunications relay system is a satellite communications system.

9. The system of claim 2 wherein the at least one accelerometer comprises three accelerometers, each aligned respectively with the buoy's vertical axis and two horizontal axes.

10. A method for measuring spectra of surface ocean waves in near real-time from a discus-shaped buoy floating at the ocean surface and moored to the seafloor, the discus-shaped buoy moving in response to wave action, the method comprising the steps of:

measuring acceleration and angular rate of the buoy using buoy motion sensors, mounted to the buoy;

converting, in a wave processing system coupled to the buoy motion sensors, acceleration and angular rate vertical acceleration and pitch and roll measurements of the buoy and generating wave spectral data from vertical acceleration and pitch and roll measurements of the buoy, correcting, in the wave processing system, vertical acceleration measurements to compensate for pitch and roll of the buoy:

transmitting, using a telecommunications relay system coupled to the wave processing system, wave spectral data to a shoreside processing system;

processing, at the shoreside processing system, the wave spectral data to remove noise from the wave spectral data; and disseminating, from the shoreside processing system, processed wave spectral data to users, wherein the step of processing at the shoreside processing system further comprises correcting noise for at least one frequency band, where:

C11M(f(n)) is the acceleration spectral density for a frequency, f(n), where n presents the index of the frequency band; and The Noise Correction for each frequency band (NC(f(n))) is computed as follows:

$$NC(f(n))=20*C11M(f(n=0))*(f(n)-0.18), \text{ for } NC(f(n))>=0;$$

$$NC(f(n))=0, \text{ for } NC(f(n))<0; \text{ and}$$

NC(f(n)) is then subtracted from each C11M(f(n)) and if a result of the subtraction is less than zero, then the result of the subtraction is set to zero.

11. A method for measuring spectra of surface ocean waves in near real-time from a discus-shaped buoy floating at the ocean surface and moored to the seafloor, the discus-shaped buoy moving in response to wave action, the method comprising the steps of:

measuring acceleration and angular rate of the buoy using buoy motion sensors, mounted to the buoy;

converting, in a wave processing system coupled to the buoy motion sensors, acceleration and angular rate vertical acceleration and pitch and roll measurements of the buoy and generating wave spectral data from vertical acceleration and pitch and roll measurements of the buoy, correcting, in the wave processing system, vertical acceleration measurements to compensate for pitch and roll of the buoy;

transmitting, using a telecommunications relay system coupled to the wave processing system, wave spectral data to a shoreside processing system;

processing, at the shoreside processing system, the wave spectral data to remove noise from the wave spectral data;

disseminating, from the shoreside processing system, processed wave spectral data to users;

determining buoy orientation with respect to True North from measurements of Earth's Magnetic flux by the three orthogonal magnetometers, pitch and roll information from the angular rate sensors, corrections for the buoy's hull and electronic effects, and the magnetic declination at the buoy's location; and determining wave direction from pitch and roll data relative to buoy orientation with respect to True North, wherein the buoy motion sensors comprise at least one accelerometer aligned with the buoy's vertical axis, three orthogonal angular rate sensors, and three orthogonal magnetometers.

12. The method of claim 11, wherein the step of converting further comprises using Fast Fourier Transforms (FFTs) to transform the acceleration and angular rate data time domain into the frequency domain providing Fourier coefficients at discrete frequencies.

13. The method of claim 12, wherein the step of converting further comprises band averaging the Fourier coefficients of adjacent discrete frequencies of the wave spectrum to reduce data transmitted to the shoreside processing system.

14. The method of claim 13, wherein the step of converting further comprises transforming band-averaged Fourier coefficients into a set of directional wave parameters in terms of spectral density, directions, and spreading functions of the waves using a predetermined algorithm.

15. The method of claim 14, wherein the step of converting further comprises computing statistics including one or more of mean, maximum, minimum, and standard deviation of time series measurements.

16. The method of claim 11, wherein the at least one accelerometer comprises one accelerometer aligned with the buoy's vertical axis.

17. The method claim 11, wherein the telecommunications relay system is a satellite communications system.

18. The method of claim 11, wherein the at least one accelerometer comprises three accelerometers, each aligned respectively with the buoy's vertical axis and two horizontal axes.

* * * * *